March 14, 1950     S. S. RICE     2,500,868
CURRENT COLLECTOR INSERT

Filed Oct. 26, 1948

INVENTOR.
SEYMOUR S. RICE
BY
ATTORNEY

Patented Mar. 14, 1950

2,500,868

UNITED STATES PATENT OFFICE 2,500,868

CURRENT COLLECTOR INSERT

Seymour S. Rice, Mansfield, Ohio, assignor to The Ohio Brass Company, Mansfield, Ohio, a corporation of New Jersey Application October 26, 1948, Serial No. 56,487

12 Claims. (Cl. 191—59.1)

This invention relates to current collectors and has particular reference to inserts used in current collectors to form a moving contact with the trolley wire.

At the present time these inserts are made wholly of carbon which may or may not be impregnated with a metal while in a fluid or molten state.

Such inserts are disclosed in U. S. Patents 2,185,257 and 2,185,270.

Such inserts have been and are being used in large and increasing numbers especially in connection with sliding or shoe type of current collectors where the insert moves along and in frictional engagement with the trolley wire as the wear upon the trolley wire is much less than where the contacting member is of metal.

The carbon inserts referred to above are subject to rather rapid wear but easily renewable. However it is my purpose to provide an insert which will give a greater number of miles of service.

Other objects of my invention are to provide an insert which will be a better conductor electrically than those referred to above and which will have incorporated therein lubricating means and which will better resist impact forces and which show a minimum of uneven wear both horizontally and vertically of the insert.

These and other objects and benefits I secure by the means hereinafter disclosed and illustrated in the accompanying drawing in which—

Figure 1:
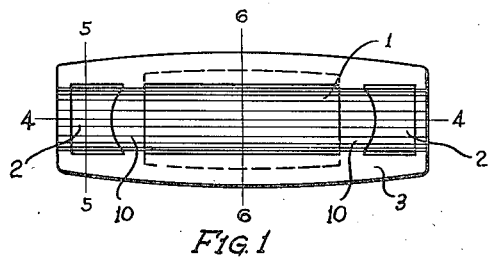
Fig. 1 is a top plan view of my improved insert.
Figure 5:
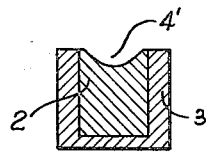
Fig. 5 is a transverse section on the line 5—5 of Fig. 1.
Figure 2:
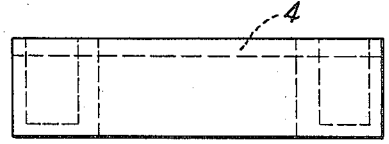
Fig. 2 is a side view in elevation of Fig. 1.
Figure 3:
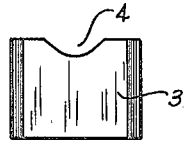
Fig. 3 is an end view of Fig. 2.

In the preferred construction of my insert I employ a central rectangular member 1 of carbon which is preferably impregnated with metal while in a molten condition. Such metal may be of a relatively low melting point or of an alloy of such metals and which alloy is usually referred to in the trade as a bearing or a Babbitt metal. One such alloy could be 85% lead, 13% antimony and 2% tin.

I have found that a large percentage of the wear of the all-carbon insert results from burning by arcs formed between it and the trolley wire and this condition occurs primarily at the extremities of the insert.

The presence then of a metal which will provide good wire contact, good conductivity, and high resistance to arcing will do much toward reducing this wear. I have and successfully used gray iron in the tip members 2.

These tip members may be of forged steel and there are other metals which may be used, also they may be formed from powdered metals and then sintered. I prefer that the tips 2 should have a hardness approximating or exceeding somewhat that of the trolley wire and therefore provide the necessary resistance to mechanical wear.

I also employ a retaining jacket 3 of soft metal such as referred to above which serves to aid in the lubrication of the hard tips 2.

In the assembly of the above parts, the carbon member 1 is placed central of the insert. The metal tips 2 are placed in spaced longitudinal alignment with the carbon member 1 and these elements are then surrounded on all vertical sides with the soft metal jacket 3 which holds them in position relative to each other and forms a unit construction.

This assembly is best accomplished in a mould whereby the shape and size of the insert is under control which is important where worn inserts are to be replaced. The said elements form the surface of a groove.

The completed insert is formed with a longitudinal groove 4 in its upper or contact face from end to end to receive and retain the trolley wire and to guide the insert along the wire.

The jacket 3 is shown at 5 as extending beneath the tips 2 and the carbon member 1 as flush with the bottom surface of the insert but the jacket metal may also extend beneath the carbon member 1.

The metal of the jacket laps over the upper longitudinal edges of the carbon member as at 6 for further retaining the carbon member 1 in position; also the side faces may be slightly roughened.

The tip 2 function in several ways to contribute to the success of and improvement of my insert over the prior art and this is due to large extent to their construction or shape.

The tip is shown in Figs. 7 to 10 inclusive and may be said to be of rectangular shape with a top groove 4' which is aligned with and forms a part of the over-all longitudinal groove 4 of the insert and has a conical shaped groove 7 in one vertical or side face with its apex down and its base intersecting the groove 4' thus making the length of the grooved contact surface as at its transverse center 8 of less length than the length of the sides or longitudinal edges of the groove as at 9.

The shape of the tip is such that it is retained in position by the jacket metal but the sides of the tip may be slightly grooved or roughened if desired to increase such hold.

The soft metal 10 between the tips and carbon member and that at the extreme ends of the insert act as lubricating means to the tips as also does the carbon member 1.

As the metal tips offer the greatest resistance to wear as compared with the carbon member and jacket, I have used this characteristic in the shaping of the tips in such manner that they guide the wire both horizontally and vertically and therefore effect even wear in service.

Figure 4:
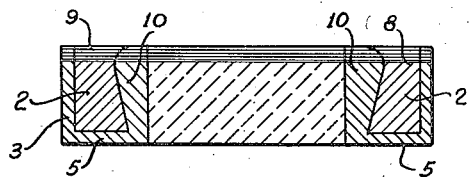
Fig. 4 is a vertical section on the line 4—4 of Fig. 1.
Figure 6:
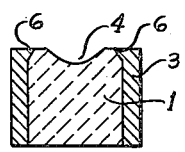
Fig. 6 is a transverse section on the line 6—6 of Fig. 1.
Figure 7:
Figs. 7, 8, 9 and 10 are several views of a metal tip which forms a part of my improved insert at each end thereof.
Figure 8:
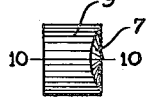
Figure 9:
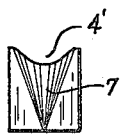
Figure 10:
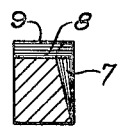

I expose less of the wear resistant tip 2 at the center of the groove 4' as shown at 8 Figs. 4 and 10 and more along the extreme sides of the groove as at 9, Figs. 4, 8 and 10, thus promoting greater wear resistance along the sides of the groove 4' and therefore tend to hold the wire in the center of the groove 4 of the insert.

Likewise if there is an increasing length of this wear resisting metal of the tip exposed as wear progresses downward (see Fig. 4) and since there is a hard metal tip 2 at each end of the insert then the vertical wear of the insert tends to be equalized from end to end of the insert. If one end starts to wear faster than the other end a greater length of wear resistant metal of the tip results due to the increasing thickness of the tip from top to bottom (Figs. 4 and 10) and the wear is correspondingly slowed down at this one end relative to the wear at the other end.

The soft metal jacket 3 provides an excellent contact between the current collecting surface by the insert and the holder (not shown) and prevents a sharp cutting edge on the hard metal tip and also provides protection for the frangible carbon. When cast around the tips and carbon member it effects a one piece insert.

I have found that the length of the contact surface at the bottom 8 of the groove 4' in the tip should not be too great or it will tend to wear the trolley wire.

Inserts have been made in the past entirely of ferrous metal and were found to effect a high degree of wear of the trolley wire and have been discarded except in a very few special cases.

As before stated it is important that the length of the contact surface 8 of the metal tips should not be so great as to cause wear of the trolley wire when considered with the pressure of the insert against the wire and the amount of lubrication of the tip surface from the carbon member and the soft metal jacket.

Take for instance an insert of substantially the size shown on Figs. 1 and 4 and the arrangement of the elements as shown therein and a pressure and speed of the insert relative to the trolley wire of 26 pounds and 29 miles per hour and drawing 100 amperes I have found by test that the insert with iron tips up to ½ inch length of the contact surface 8 will prolong the life of the insert and also decrease the wear on the trolley wire particularly in wet weather, but an increase in the length of the iron tips over said ½ inch will cause rapid increase in the wear on the trolley wire as the result of such insert.

Figure 11:
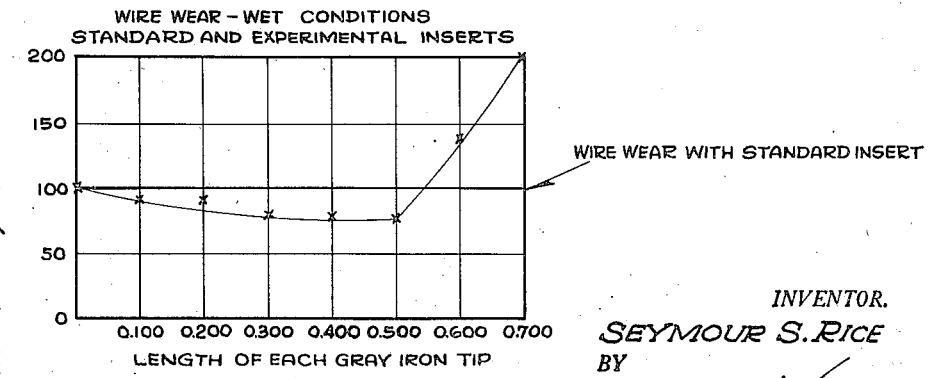
Fig. 11 is a graph showing the effect of wear of my improved insert upon a trolley wire under different features of construction and as compared to the effect of wear of an all carbon insert.

In Fig. 11 is shown a graph of such test as compared with the results secured on an insert of all carbon impregnated with a soft metal and it will be noted that as the length of the contact surface 8 on the tips is increased from 0.1 inch to 0.5 inch the wear on the trolley wire decreased but at the latter length of contact of the tips (0.5") the wear suddenly increases.

With other constructions of the insert particularly as to the construction and relation of the carbon member 1 and the soft metal portions relative to each other and to the tips 2, it will be apparent that the contact surface of the metal tips 2 will vary from that given in the above example and can be determined only by actual tests as the lubrication of the tips will be materially affected by such relation.

The melting point of the metal in the jacket or casing 3, is preferably between that of tin and of antimony or an alloy of any two or more of tin, bismuth, zinc and antimony.

A tip 3 of the same metal as that of the trolley wire especially if the wire is of copper has a tendency to "stick" to the wire, therefore I prefer to form the tips of a dissimilar metal somewhat harder than the trolley wire.

The insert is shown as wider at the center with convex sides and therefore will fit holders shown in the aforesaid Letters Patent.

If desired, the insert and holder therefore may be made as one piece as is the shoe in U. S. Patent 1,893,383 and the principles of construction herein disclosed applied in the unit construction.

While I have defined in a number of claims the metal tips including those formed of powdered metal as located at the ends of the insert it is to be understood that this should be interpreted as covering tips either flush with the end faces of the insert or spaced therefrom as in Fig. 1.

What I claim as new and desire to secure by United States Letters Patent is:

1. A current collector comprising in combination a pair of metal tips each having a contact surface adapted to slidingly engage a trolley wire, the tips formed of a ferrous metal and arranged in longitudinal alignment, a central member of carbonaceous material between the tips having a contact surface to engage the trolley wire, the combined length of the tips being less than the contact surface of the central member, a jacket of metal with a melting point between 200 deg. F., and 1150 deg. F., extending across the ends of the collector and forming side and bottom faces of the current collector except along the bottom face of the central member whereby the said central member and the metal of the jacket will lubricate the tips as the current collector moves along a trolley wire.

2. A sliding current collector for a trolley head comprising in combination a central member of current conducting material, a pair of metal tips at the ends of the current collector and a casing of metal associated with the tips and central member to maintain the tips and central member in fixed and longitudinal alignment, a groove having a contact surface formed in one face of the current collector to receive a trolley wire in engagement with the tips and central member and casing, each tip having two intersecting grooved means, one a longitudinal groove forming a part of the first said groove and having a contact surface to engage the trolley wire, the said longitudinal grooves of the tips being so formed that they offer a greater contact surface along the side walls of the groove than along the bottom of the groove for the purpose described.

3. A wear tip for a current collector comprising a current conducting member of rectangular form having a groove along one face and a conically shaped groove along an intersecting face, the last said groove intersecting the first said groove.

4. A wear tip for a current collector comprising a body of metal having two faces intersecting at right angles, one face provided with a groove of uniform width, the other face provided with a conically shaped groove with its apex away from the first said groove and its base intersecting the first said groove.

5. An insert for a current collecting trolley head comprising an elongated body of a plurality of current conducting members, a longitudinal groove extending the entire length of the body and arranged to receive a trolley wire and the insert guided thereby as the collector moves along the wire, the body having a central member of carbonaceous material with a groove forming a part of the longitudinal groove, the body provided with a pair of members to resist wear to a greater extent than the said central member and provided with a groove also forming a part of the longitudinal groove, the wear members positioned adjacent the ends of the collector, and a casing of a metal softer than that of the wear members and enclosing the side and end faces of the body to maintain the central and wear members in alignment, the end portion of the casing also provided with grooves having surfaces to contact the trolley wire and aligned with those of the central and wear members and forming a part of the longitudinal groove.

6. A current collector for a trolley head comprising a current conducting elongated body consisting of several separately formed elements namely—a pair of metal tips at the ends of the body, a central member of electrical conducting material forming lubricating means for the metal tips, a casing for the tips and central member to hold the tips and central member in fixed relation, the casing formed of a soft metal of less hardness and lower melting point than that of the tips and acting as a lubricant for the tips, the side faces of the body being convexly formed with respect to the longitudinal axis of the body with the greatest width adjacent the longitudinal center, and a longitudinal groove having its surface composed of the exposed surfaces of the above said elements.

7. A current collector for a trolley head comprising in combination an elongated body of electrical conducting materials provided with a longitudinal groove having a trolley wire contacting surface in one face, the body provided with a carbonaceous member impregnated with a metal while in a molten condition, tips at the ends of the body of a current conducting material having a greater wear resisting property than the carbonaceous member, and a metal jacket associated the tips and carbonaceous member to hold them in a predetermined relation the said tips having a groove of uniform width contributing to the said longitudinal groove, the contacting surface of the groove in the tips being of varying extent.

8. A current collector for a trolley head comprising in combination an elongated body of several electrical conducting materials namely, a central member of non-metallic material, a wear resisting member of metal at each end of the body in longitudinal alignment with the central member, metallic means holding the wear resisting members and central member in fixed relation, a longitudinal groove in one face of the collector to receive a trolley wire, a groove formed in a face of each member and the surface thereof forming a part of the surface of the longitudinal groove to engage the trolley wire, the wear resisting members each provided with other means intersecting the groove thereof whereby the contact surface of the groove of the wear resisting members varies from a minimum at the bottom of the groove to a maximum at the longitudinal edges of the grooves and the surface at the bottom of the groove of each wear resisting member offering an increasing extent of exposed surface as the members forming the groove wear away through frictional engagement with the trolley wire.

9. A current collector for a trolley head comprising in combination a central member, a pair of tip members aligned with the central member, one tip member at each end of the collector, a casing member encircling the said members to hold the members in fixed relation, the said members formed of current conducting material of different degrees of hardness, and a groove extending along one face of the collector and each member having a contacting surface forming a part of the said groove, the tips provided with a second groove having a face disposed at an angle to the contacting surface of the tips intersecting the said contacting surface, the said second groove being so shaped that the contacting surface will vary in length when new and vary therefrom as the tips wear due to use.

10. A wear resisting tip for a current collector comprising, a body of current conducting material having a groove along one face, the surface of which groove is adapted to contact a trolley wire, the said groove being of uniform width but the length of the bottom of the groove being less than the length of the longitudinal side edges of the groove whereby the exposed contact surface of the groove increases from the bottom of the groove to the longitudinal edges of the groove.

11. A wear resisting tip for a current collector comprising, a body of current conducting material having two intersecting faces, one face provided with a groove of uniform width to engage a trolley wire and the other face provided with means so constructed and related to the said groove as to provide the said groove with a contact surface of varying longitudinal length between the bottom of the groove and the longitudinal edges of the groove.

12. A wear resisting member for a current collector comprising a body of current conducting material having a groove with a contacting surface along one face to engage a trolley wire, means associated with another face of the body and intersecting the said groove whereby the length of longitudinal edges of the groove are greater than the longitudinal length of the groove intermediate the edges.

SEYMOUR S. RICE.

REFERENCES CITED

The following references are of record in the file of this patent:

UNITED STATES PATENTS

| Number | Name | Date |
| --- | --- | --- |
| 2,147,460 | Schaake | Feb. 14, 1939 |